US012572126B2

(12) United States Patent (10) Patent No.: US 12,572,126 B2
Choi (45) Date of Patent: Mar. 10, 2026

(54) METHOD FOR SETTING PARAMETERS OF PLC SYSTEM

(71) Applicant: LS ELECTRIC CO., LTD., Anyang-si (KR)

(72) Inventor: Ki Hong Choi, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 406 days.

(21) Appl. No.: 17/794,150

(22) PCT Filed: Jan. 7, 2021

(86) PCT No.: PCT/KR2021/000188
§ 371 (c)(1),
(2) Date: Jul. 20, 2022

(87) PCT Pub. No.: WO2021/149948
PCT Pub. Date: Jul. 29, 2021

(65) Prior Publication Data
US 2023/0069863 A1 Mar. 9, 2023

(30) Foreign Application Priority Data
Jan. 20, 2020 (KR) ........................ 10-2020-0007262

(51) Int. Cl.
*G05B 19/05* (2006.01)
(52) U.S. Cl.
CPC .. *G05B 19/056* (2013.01); *G05B 2219/15032* (2013.01)

(58) Field of Classification Search
CPC ........... G05B 2219/15032; G05B 2219/14087
See application file for complete search history.

(56) References Cited

U.S. PATENT DOCUMENTS

| | | | |
|---|---|---|---|
| 5,177,420 A | 1/1993 | Wada et al. | |
| 9,183,207 B2 * | 11/2015 | Kay ..................... | G05B 19/042 |
| 10,067,492 B2 | 9/2018 | Senda et al. | |
| 2004/0222300 A1 | 11/2004 | Strickland | |
| 2010/0083223 A1 | 4/2010 | Chouinard et al. | |
| 2012/0290539 A1 | 11/2012 | Bryant et al. | |
| 2014/0046457 A1 | 2/2014 | Taber et al. | |

(Continued)

FOREIGN PATENT DOCUMENTS

| | | |
|---|---|---|
| CN | 105589408 A | 5/2016 |
| JP | 2012247984 A | 12/2012 |

(Continued)

OTHER PUBLICATIONS

International Search Report for related International Application No. PCT/KR2021/000188; report dated Jul. 29, 2021; (7 pages).

(Continued)

*Primary Examiner* — Nathan L Laughlin
(74) *Attorney, Agent, or Firm* — K&L Gates LLP

(57) ABSTRACT
The present disclosure relates to a PLC device capable of variably setting parameters, the PLC device converting variable parameters into a parameter program command rather than into the parameters themselves so as to store same in a program memory, thereby enabling parameter values to be actively changed according to changes in sensor values of factory equipment.

4 Claims, 5 Drawing Sheets

(56)        References Cited

U.S. PATENT DOCUMENTS

| | | | |
|---|---|---|---|
| 2014/0207254 A1* | 7/2014 | Nishiyama | G05B 19/04 |
| | | | 700/11 |
| 2015/0058828 A1 | 2/2015 | Narutani et al. | |
| 2017/0115972 A1* | 4/2017 | Park | G06F 8/443 |
| 2019/0196435 A1* | 6/2019 | Song | G06F 11/203 |
| 2020/0125060 A1* | 4/2020 | Fujimura | G05B 19/056 |

FOREIGN PATENT DOCUMENTS

| | | |
|---|---|---|
| JP | 2013191151 A | 9/2013 |
| KR | 1020120099222 A | 9/2012 |

OTHER PUBLICATIONS

International Search Report for related International Application No. PCT/KR2021/000188; report dated Jul. 29, 2021; (8 pages).
Supplementary Search Report for related European Application No. 21744536.0; action dated Apr. 11, 2024; (10 pages).
Office Action for related Japanese Application No. 2022-543791; action dated Aug. 22, 2023; (2 pages).
Office Action for related Chinese Application No. 202180009889.8; action dated Apr. 23, 2025; (7 pages).

* cited by examiner

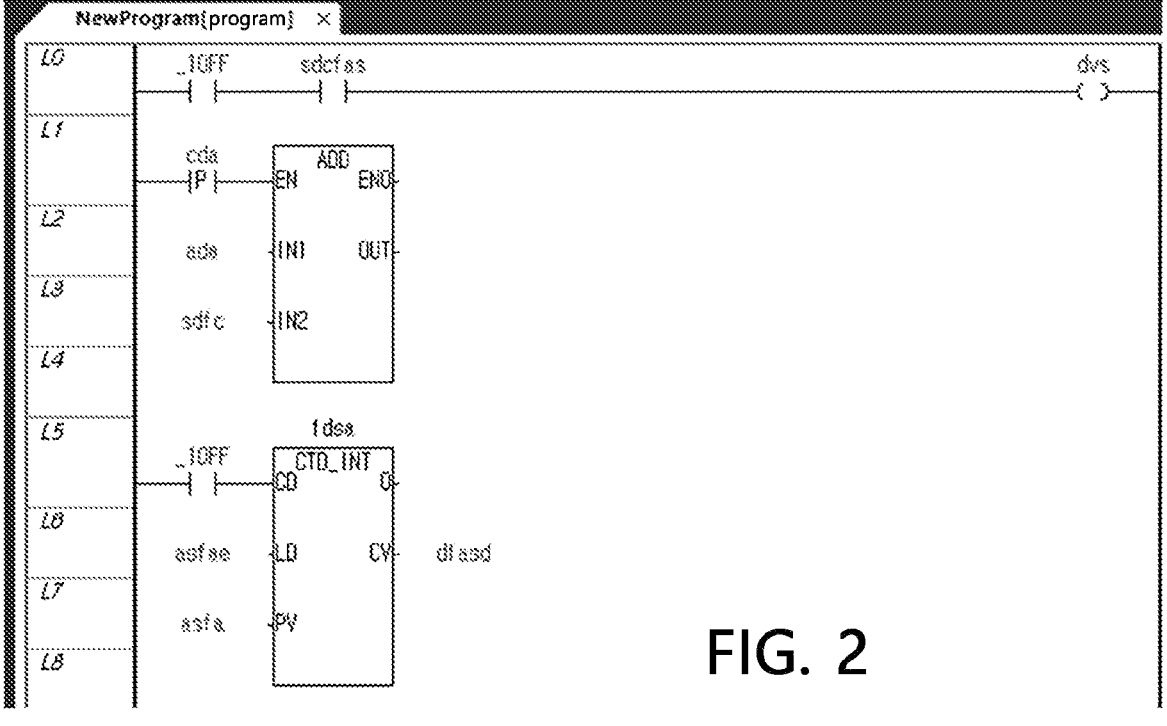

FIG. 2

| parameter | channel0 | channel1 | channel2 | channel3 | channel4 | channel5 | channel6 | channel7 |
|---|---|---|---|---|---|---|---|---|
| ☐ operation channel | stop | stop | stop | stop | stop | stop | stop | stop |
| ☐ input voltage (current) range | 1~5V | 1~5V | 1~5V | 1~5V | 1~5V | 1~5V | 1~5V | 1~5V |
| output data type | 0~16000 | 0~16000 | 0~16000 | 0~16000 | 0~16000 | 0~16000 | 0~16000 | 0~16000 |
| ☐ Filtering | prohibition | prohibition | prohibition | prohibition | prohibition | prohibition | prohibition | prohibition |
| filter constant | 1 | 1 | 1 | 1 | 1 | 1 | 1 | 1 |
| ☐ average processing | prohibition | prohibition | prohibition | prohibition | prohibition | prohibition | prohibition | prohibition |
| ☐ average method | | | | | | | | |
| average value | 2 | 2 | 2 | 2 | 2 | 2 | 2 | 2 |

XGF-AV8A (voltage type, 8 channels)                                              ?    ✕

XGF-AV8A (voltage type, 8 channels)

confirm    cancel

FIG. 3

METHOD FOR SETTING PARAMETERS OF PLC SYSTEM

CROSS-REFERENCE TO RELATED APPLICATION

The present application is a National Stage of International Application No. PCT/KR2021/000188 filed on Jan. 7, 2021, which claims priority to and the benefit of Korean Utility Model Application No. 10-2020-0007262, filed on Jan. 20, 2020, the disclosure of which is incorporated herein by reference in its entirety.

FIELD

The present disclosure relates to a control method of a programmable logic controller (PLC).

BACKGROUND

A PLC is a control device used for automatic control or monitoring of factories. It receives sensor values, performs logical operations according to a preset user program, and controls externally connected devices according to the operation results.

In order to properly set the PLC according to usage environment and perform the functions desired by a user, the PLC includes parameter items that the user can adjust, software for parameter setting, and a parameter memory to store the set parameters.

In order to set the parameters in the PLC, the method of editing the parameters using a program and debugging tool (PADT) installed in a personal computer (PC) is used. The PADT has the advantage of being able to conveniently input parameters using the GUI of the PC, but there is a problem that the PC and the PADT are absolutely necessary to set or change parameters. Also, since parameter values are stored and used in the memory of the PLC, there is a problem that the parameter values cannot be freely changed when the PLC setting is to be dynamically changed according to the change of situations in the factory.

The inventors of the present disclosure have researched to solve the problems of the conventional method for setting PLC parameters. After much effort, the inventors have completed the present disclosure by completing a method for setting PLC parameters that can actively change and apply the parameter setting of the PLC according to the factory situation.

SUMMARY

An object of the present disclosure is to provide a method for actively changing PLC parameters without PADT according to a situation in order to overcome conventional limitations that a PC and a PADT are essential to change the setting of the PLC parameters.

On the other hand, other objects not specified in the present disclosure will be additionally considered within the range that can be easily inferred from the following detailed description and effects thereof.

According to the present disclosure, a method for setting a parameter of a PLC system, which is performed by a controller including one or more processors and a memory, includes a parameter input step of inputting a parameter in a parameter editor; a parameter conversion step of converting the input parameter into a program command; and a parameter transmission step of transmitting the parameter converted into the program command to a PLC device.

Particularly, in the parameter transmission step, the parameter converted into the program command is transmitted to a parameter program memory of the PLC device.

According to the present disclosure, a method for setting a parameter of a PLC device, which is performed by a controller of the PLC device including one or more processors and a memory, includes a parameter reception step of receiving a parameter converted into a program command by a parameter editor and a program editor; and a parameter storage step of storing the received parameter converted into the program command in a parameter program memory.

In addition, after the parameter storage step, the steps of receiving a sensor value from a sensor of a factory equipment; determining a preset condition of the received sensor value; loading a parameter according to the determined condition in a parameter memory; and applying the parameter loaded in the parameter memory to an operating system of the PLC device may be further included.

According to another embodiment of the present disclosure, a PLC device which variably sets a parameter, includes a controller including one or more processors; a program memory in which a program for driving the processors and a parameter converted into a program command are stored; and a parameter memory which stores a parameter that is a result of executing the parameter program command.

A parameter program memory which stores the parameter converted into the program command may be further included.

Preferably, the controller compares a sensor value received from a sensor of a factory equipment with a preset condition, executes the parameter program command having a parameter value corresponding to the condition, and stores a resulting parameter in the parameter memory.

According to the present disclosure, there is an effect that PLC parameters can be changed according to a situation without a PC and a PADT. Therefore, it has the advantage of being able to quickly respond to the change of situations in a factory to which a PLC system is applied.

In addition, since a user can edit and set parameters using a PADT in the same manner as in a conventional art, there is an advantage that a convenient editing method of a GUI method can be utilized as it is.

On the other hand, even if it is an effect not explicitly mentioned herein, it is noted that the effects described in the following specification expected by the technical features of the present disclosure and their potential effects are treated as described in the specification of the present disclosure.

BRIEF DESCRIPTION OF THE DRAWINGS

FIG. 2 is an example of a PLC program editor according to a conventional art.

FIG. 3 is an example of a PLC parameter editor according to a conventional art.

※ It is revealed that the accompanying drawings are exemplified as a reference for understanding the technical spirit of the present disclosure, and the scope of the present disclosure is not limited thereby.

DETAILED DESCRIPTION

Hereinafter, with reference to the drawings, the configuration of the present disclosure addressed by various embodiments of the present disclosure and effects resulting from the configuration will be described. In the description of the present disclosure, if it is determined that the subject matter of the present disclosure may be unnecessarily obscured as it is obvious to those skilled in the art with respect to related known functions, the detailed description thereof will be omitted.

Terms such as 'first' and 'second' may be used to describe various components, but the components should not be limited by the above terms. The above term may be used only for the purpose of distinguishing one component from another component. For example, without departing from the scope of the present disclosure, a 'first component' may be referred to as a 'second component', and similarly, a 'second component' may also be referred to as a 'first component'. Also, the singular expression includes the plural expression unless the context clearly dictates otherwise. Unless otherwise defined, terms used in the embodiments of the present disclosure may be interpreted as meanings commonly known to those of ordinary skill in the art.

Hereinafter, with reference to the drawings, the configuration of the present disclosure addressed by various embodiments of the present disclosure and effects resulting from the configuration will be described.

Figure 1:
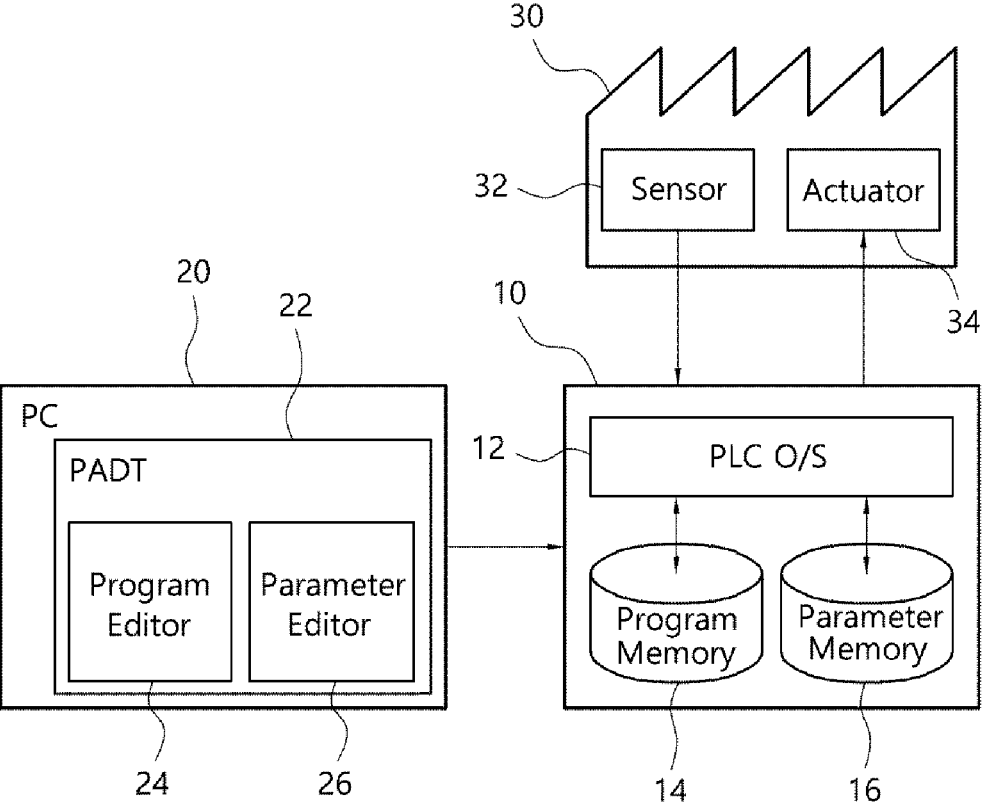
FIG. 1 is a structural diagram of a PLC system according to a conventional art.

FIG. 1 is a structural diagram of a PLC system according to a conventional art.

A PLC system is configured to include a PLC device 10, a PC 20, and a factory equipment 30.

The PC 20 is used to set up and operate the PLC device 10. The PC 20 may set a program and parameter executed in the PLC device 10 by a program and debugging tool (PADT). The PADT 22 may include a program editor 24 and a parameter editor 26.

The program editor 24 may write commands executed in the PLC device 10 in the form of a graphic user interface (GUI). It creates an output method for the input of the PLC device 10. FIG. 2 shows an example of a program editor according to a conventional art.

The parameter editor 26 also allows a user to set a parameter in a GUI form. FIG. 3 shows an example of a parameter editor according to a conventional art.

The programs and parameter created by the PADT 22 of the PC 20 are loaded in a program memory 14 and a parameter memory 16 of the PLC device 10, respectively.

The PLC device 10 includes the program memory 14 and the parameter memory 16 to control the factory equipment 30. To this end, a controller (not shown) on which an operating system (PLC O/S) 12 can be executed may be included. The controller may include one or more processors and a memory.

The PLC device 10 receives sensor values from a sensor 32 of the factory equipment and determines a parameter based on the value executed by a user program to control an actuator 34.

However, since the parameter value stored in the parameter memory 16 is fixed as described above, the PC 20 and the PADT 22 are absolutely necessary to change the parameter. Then, in a situation where the PC 20 or the PADT 22 cannot be used, there is a problem that the parameter of the PLC device 10 cannot be changed for application. In addition, in a situation where the PLC device 10 wants to apply a parameter that is dynamically changed according to the change of the situation input during operation of the factory equipment, there is also a problem that makes the operation difficult.

Figure 4:
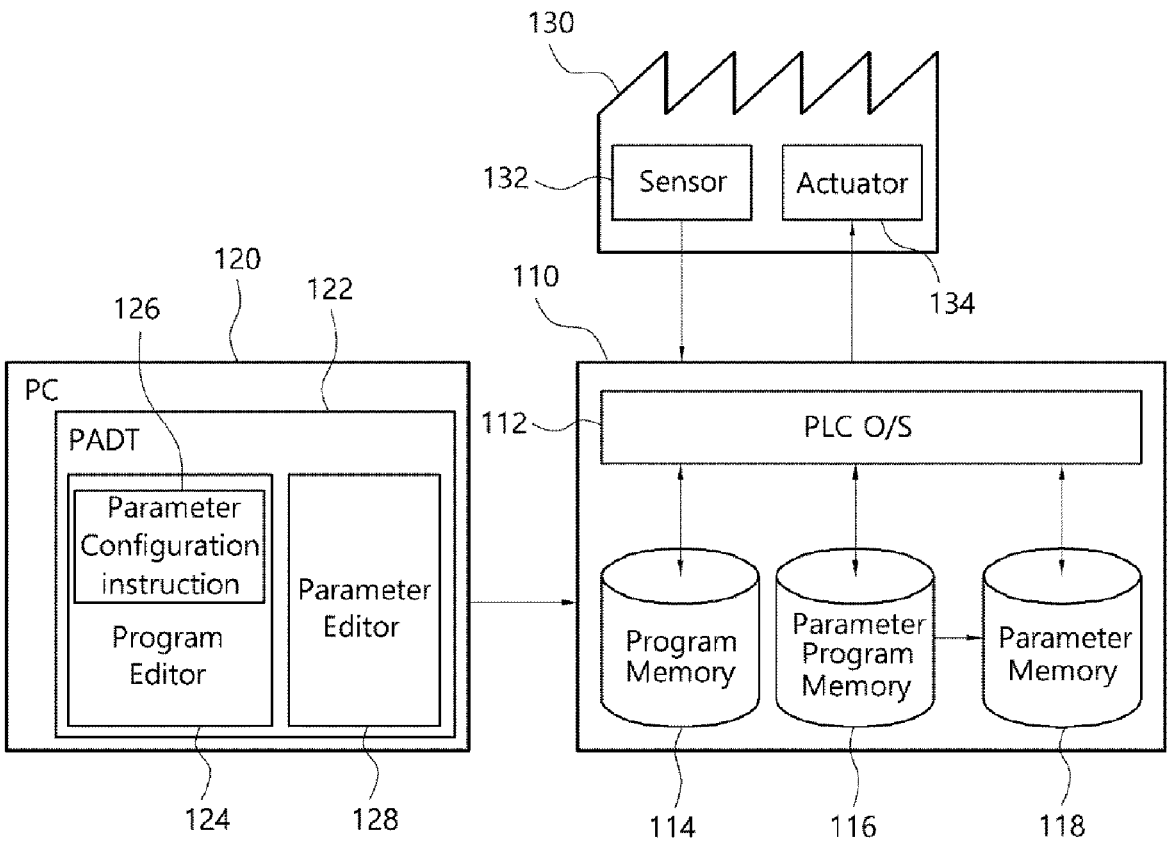
FIG. 4 is a schematic structural diagram of a PLC system according to a preferred embodiment of the present disclosure.

FIG. 4 is a schematic structural diagram of a PLC system according to a preferred embodiment of the present disclosure for solving this problem.

A PLC device 110 further includes a parameter program memory 116 that stores a parameter converted into a program, unlike the conventional PLC device.

In addition, a PADT 122 of a PC 120 further includes a parameter configuration instruction 126 for converting a parameter into a program command.

The parameter editor of the PADT 122 receives necessary parameters from a user as in the conventional art. The parameter values input in this way are not directly transferred to a parameter memory 118 unlike the conventional art. Instead, a program editor 114 converts the parameter values into a program command.

Figure 5:
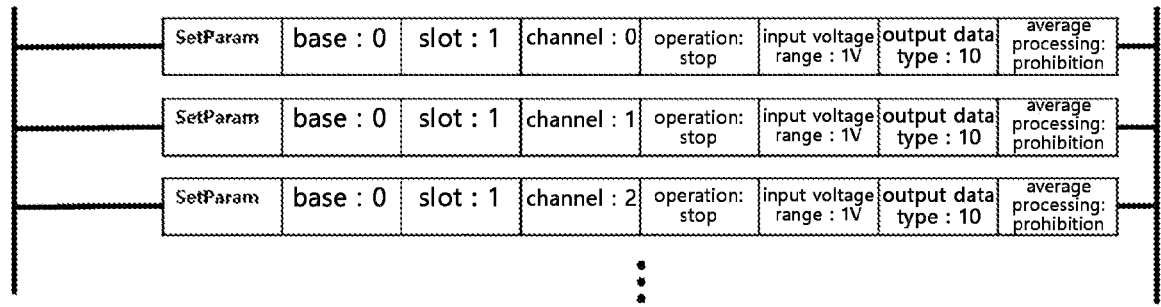
FIG. 5 is an example of a parameter converted into a program command according to a preferred embodiment of the present disclosure.

Then, the parameter program commands converted into a program command are stored in the parameter program memory of the PLC device 110. FIG. 5 shows an example of parameters converted into a program command.

The parameters stored in the parameter program memory 116 are loaded in the parameter memory 118 by the execution of a command. The parameters loaded in the parameter memory 118 are used to operate the input data of the factory equipment 130 by the PLC operating system (O/S) 112 and output the operation result.

The sensor values measured by the sensor 132 of the factory equipment 130 are determined by the PLC operating system 112, and the parameters can be dynamically changed according to the determination result. In order to change the parameters, the parameters are stored in the parameter memory 118 by executing the parameter program commands stored in the parameter program memory 116, unlike the conventional art in which the parameters are loaded in the parameter memory using the PC and the PADT, The PLC operating system 112 can use it directly. It is possible to load parameter values in the parameter memory 118 without going through the PC 120 and the PADT 122.

The example of FIG. 5 shows an example in which parameter values are stored in the parameter program memory 118 in the form of a SetParam command.

The SetParam command is a command for setting parameters. When the SetParam command is executed, the parameters stored together with the SetParam command are loaded in the parameter memory 118. Since several divided slots and channels are connected to one base in the PLC, the parameters for base, slot, and channel are saved according to which PLC is to be controlled. The parameter related to the operation and the parameters related to input and output ranges and corresponding processing are stored together and loaded in the parameter memory according to the execution of the SetParam command, which can be used by the PLC operating system 112 at a necessary time.

Figure 6:
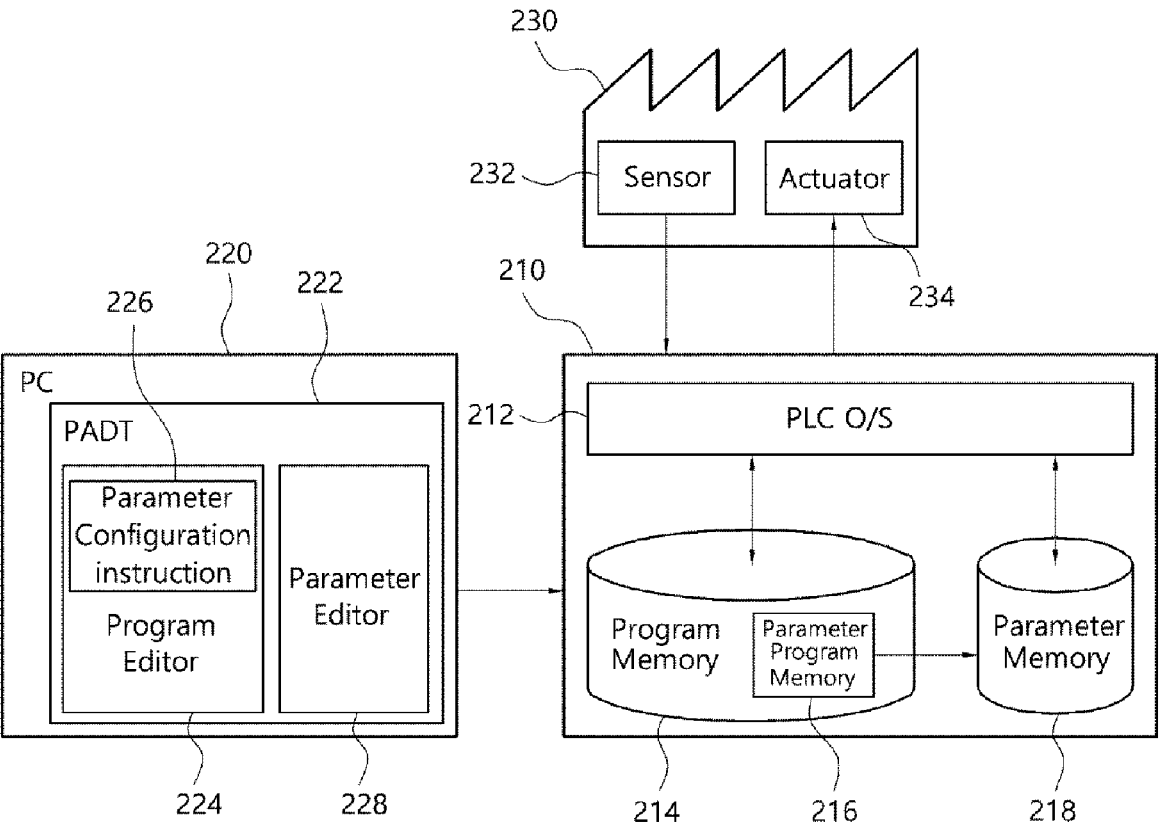
FIG. 6 is a schematic structural diagram of a PLC system according to another embodiment of the present disclosure.

FIG. 6 shows an example of a PLC device according to another embodiment of the present disclosure.

The memory in a PLC device 210 may be configured to include a program memory 214 and a parameter memory 218. However, unlike in the embodiment of FIG. 4, this is the case in which the program memory 214 and the parameter program memory 216 are not physically separated, but they use different regions of the same memory.

When the program command in the area of the parameter program memory 216 is executed by the PLC operating system 212, the parameters included in the program command are loaded in the parameter memory 218 and used to operate the factory equipment 230.

Figure 7:
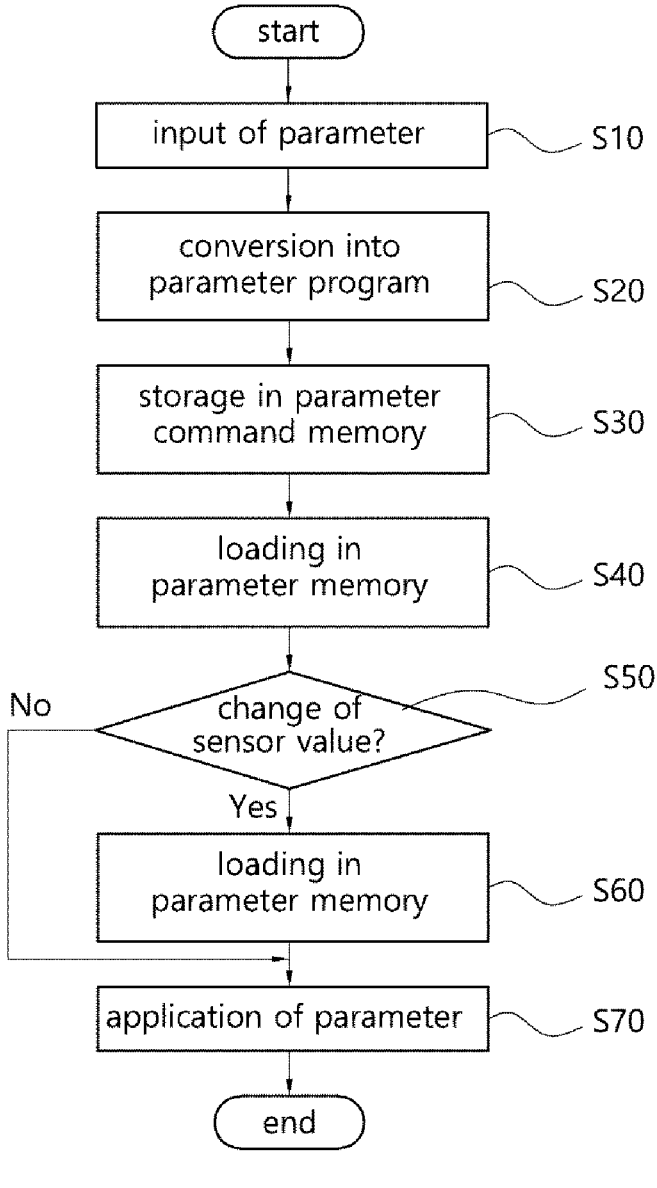
FIG. 7 is a flowchart of a method for setting a PLC parameter according to a preferred embodiment of the present disclosure.

FIG. 7 schematically shows a method for setting and changing a parameter, which is operated by a PLC system.

The method for setting the parameter of a PLC system according to the present disclosure may be operated by a controller including one or more processors and a memory. The processors of the controller may execute program commands for setting the parameter of the PLC system, and the program commands and data for driving the processors may be stored in the memory.

When a parameter is input from a user (S10), it is not directly loaded in the parameter memory, but is converted into a parameter command (S20).

The parameter converted into a command form is not stored in the parameter memory but in the program memory (S30). In another embodiment, the parameter converted into a command may be stored in a parameter program memory that is distinguished from the program memory.

The parameters stored in the program memory or parameter program memory are loaded in the parameter memory by being executed as a command when necessary (S40).

The operating system of the PLC device determines the change in the sensor values according to the sensor input value of the factory equipment (S50), and if it satisfies a preset condition, the operating system executes parameter commands to load the changed parameter and loads the changed parameters to the parameter memory (S60). For example, if, among the sensors 132 of the factory equipment 130, the measured value of the sensor responsible for the input voltage is increased higher than a preset voltage, the parameter command for changing a motor setting parameter is executed in order to lower the rotational speed of the motor, and the parameter is loaded in the parameter memory.

The parameters reloaded in the parameter memory are used for operation of the factory equipment by the PLC operating system (S70).

According to the present disclosure as described above, the parameter is not directly stored in the parameter memory, but is converted into a command form and stored in the form of a program, so that when a parameter change is required, the parameter can be actively changed even without a PC or PADT.

The protection scope of the present disclosure is not limited to the description and expression of the embodiments explicitly described above. In addition, it is added once again that the protection scope of the present disclosure cannot be limited due to obvious changes or substitutions in the technical field to which the present disclosure pertains.

The invention claimed is:

1. A method for determining parameters of a programmable logic controller (PLC) device, the method comprising:

converting parameters into program commands by a PADT (Programming and Debugging Tool), the program commands comprising instructions to load the parameters into a parameter memory of the PLC device according to a condition of sensing information;

receiving and storing, by the PLC device, the program commands in a program memory of the PLC device;

receiving, by the PLC device, a signal including sensing information from a sensor of a factory facility;

determining, by the PLC device, a condition of the sensing information;

executing, by the PLC device, the program commands to load the parameters into the parameter memory according to the condition of the sensing information; and applying, by the PLC device, the parameters in an operating system of the PLC device, wherein the PLC device comprises the parameter memory and the program memory separately, wherein the PADT is an interface program configured to set programs and parameters of the PLC device via a user terminal.

2. The method of claim 1, wherein the PLC device determines the condition of the sensing information and executes the program commands to load the parameters into the parameter memory according to the condition of the sensing information when disconnected from the PADT.

3. A programmable logic controller (PLC) device configured to determine parameters, comprising:

a controller comprising one or more processors;

a program memory configured to store a program for driving the one or more processors and program commands; and a parameter memory configured to store parameters, wherein the controller is configured to:

determine a condition of sensing information included in a signal received from a sensor of a factory facility;

execute the program commands to load the parameters into the parameter memory according to the condition of the sensing information; and apply the parameters in an operating system of the PLC device, wherein the program commands are generated by a PADT (Programming and Debugging Tool) by converting the parameters into the program commands, the program commands comprising instructions to load the parameters into the parameter memory according to the condition of the sensing information, and wherein the PADT is an interface program configured to set programs and parameters of the PLC via a user terminal.

4. The PLC device of claim 3, wherein the PLC device determines the condition of the sensing information and executes the program commands to load the parameters into the parameter memory according to the condition of the sensing information when disconnected from the PADT.

* * * * *